(12) United States Patent
Yuan et al.

(10) Patent No.: US 8,055,558 B2
(45) Date of Patent: Nov. 8, 2011

(54) METHOD AND SYSTEM FOR AUTHENTICATION VIA COMMUNICATION TERMINAL USING SHORT MESSAGE

(75) Inventors: Leiming Yuan, Hangzhou (CN); Chengang Wu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 135 days.

(21) Appl. No.: 12/448,967

(22) PCT Filed: Jan. 17, 2008

(86) PCT No.: PCT/CN2008/070123
§ 371 (c)(1),
(2), (4) Date: Jul. 15, 2009

(87) PCT Pub. No.: WO2008/089684
PCT Pub. Date: Jul. 31, 2008

(65) Prior Publication Data
US 2010/0082462 A1    Apr. 1, 2010

(30) Foreign Application Priority Data
Jan. 23, 2007  (CN) .......................... 2007 1 0002708

(51) Int. Cl.
*G07B 17/00* (2006.01)
(52) U.S. Cl. .............. 705/30; 705/41; 705/44; 455/466; 455/558
(58) Field of Classification Search ............... 705/30, 705/44; 455/466
See application file for complete search history.

(56) References Cited

U.S. PATENT DOCUMENTS

| | | | |
|---|---|---|---|
| 6,233,565 B1 | 5/2001 | Lewis et al. | |
| 6,385,596 B1 | 5/2002 | Wiser et al. | |
| 6,629,081 B1 | 9/2003 | Cornelius et al. | |
| 6,816,721 B1 * | 11/2004 | Rudisill | 455/406 |
| 6,868,391 B1 | 3/2005 | Hultgren | |
| 6,877,094 B1 | 4/2005 | DiGiorgio et al. | |
| 6,879,965 B2 | 4/2005 | Fung et al. | |

(Continued)

FOREIGN PATENT DOCUMENTS

| | | |
|---|---|---|
| CN | 1794298 | 6/2006 |
| CN | 101051372 | 10/2007 |

*Primary Examiner* — Vanel Frenel
(74) *Attorney, Agent, or Firm* — Van Pelt, Yi & James LLP

(57) ABSTRACT

The present invention discloses a method and a system for authentication via a communication terminal using short messages, in order to solve the problems that the content of a short message is easy to be leaked out by a proxy SP and that the loss and delay of a short message may lead to repeating user payments. The method includes: sending, by the communication terminal to a payment system via an SP1, a short message payment request including a payee's account identifier and a payment amount; creating, by the payment system, a payment record corresponding to the request and sending verification information to the communication terminal via an SP2, the verification information including the payee's account identifier and the payment amount; replying, by the communication terminal, confirmation information to the payment system via the SP2, upon confirming that the payee's account identifier and the payment amount in the verification information are correct; and performing, by the payment system, a payment operation. The present invention uses a dual channel (SP1 and SP2) asynchronous transmission mechanism. The situation where any one of the channel is illegally controlled and thus short message information is leaked out can be prevented and the user can cancel a repeated payment in confirmation of the payment.

16 Claims, 2 Drawing Sheets

U.S. PATENT DOCUMENTS

| | | |
|---|---|---|
| 7,051,002 B2 | 5/2006 | Keresman, III et al. |
| 7,069,234 B1 | 6/2006 | Cornelius et al. |
| 2004/0019564 A1* | 1/2004 | Goldthwaite et al. .......... 705/44 |
| 2007/0156579 A1* | 7/2007 | Manesh ......................... 705/39 |

* cited by examiner

METHOD AND SYSTEM FOR AUTHENTICATION VIA COMMUNICATION TERMINAL USING SHORT MESSAGE

This application claims priority to PCT Application No. PCT/CN2008/070123 (Publication No. WO 2008/089684), filed on Jan. 17, 2008 and entitled "Method and System for Authentication via Communication Terminal Using Short Message", which is incorporated herein by reference for all purposes and which claims priority to Chinese Patent Application No. 200710002708.0, filed with the Chinese Patent Office on Jan. 23, 2007 and entitled "Method and System for Authentication via Communication Terminal Using Short Message", which is incorporated herein by reference for all purposes.

FIELD OF THE INVENTION

The present invention relates to information authentication techniques and in particular to a method and a system for authentication via a communication terminal using short messages.

BACKGROUND OF THE INVENTION

Information security is important in many applications of services, especially in the financial field where payment security has always been an issue that draws a lot of attention. Currently, one payment method is to perform authentication via a communication terminal using short messages and then finish the payment. The method takes advantage of the great number of users of communication terminals (including cell phones, Personal Handy-phone System terminals and other devices capable of making short message interactions) and the growing number of issued bank cards. By binding a bank account or a third-party virtual account to a communication terminal, SMS (Short Messaging Service) messages can be sent via the communication terminal to a particular service number for account transfer, product purchase, etc.

Now refer to FIG. 1, which illustrates the current method for authentication via a communication terminal using short messages. First, with the short message interaction function of a communication terminal 101, a user inputs important information such as payee's account, payment amount and payment password, which is sent in a particular format to a short message interaction system 102. The short message interaction system 102 extracts key information from the received short message, including the number of the communication terminal that sent the short message, payee's account identifier, payment amount and payment password, finds a payment account with which the communication terminal number has a binding relationship, and forwards information such as the payment account identifier, payee's account identifier, payment amount and payment password to a payment system 103. The payment system 103 receives the payment request, transfers the payment amount from the payment account of the user to the payee's account after it determines that the payment password inputted by the user is correct and returns operation information to the user.

During the above procedure, the biggest challenge for short message payment via communication terminals is security. Currently, the short message interaction system 102 is normally delegated by an SP (Service Provider) and short message interactions are done in plaintext (unencrypted data format). Furthermore, short messages are to be sent in the plaintext form when the user inputs transfer information and short messages sent by the user are to be stored in the plaintext form at the user's communication terminal. Therefore, payment information of the user is at risk in the following two aspects:

The first risk occurs when the proxy SP forwards the short message. Because the content of the short message is extracted by the proxy SP end, if the proxy SP leaks important information such as the payment account identifier, payment password, payee's account identifier and payment amount to other people, a lot of damage may be done to the user. For example, someone may change the payee's account and the payment amount to his own account and a greater amount, or take money directly from the payment account using the payment password. The second risk occurs when sent short messages stored in the user's communication terminal are viewed by other people. Important information such as payment password, payee's account identifier and payment amount are also easy to be leaked out and illegally used by other people.

In addition, current short message gateways have stability issues; the loss rate and delay rate of short messages are relatively high. Once the short message indicating successful payment is not received in time, the user may initiate the transaction continuously; or when the waiting time expires, the short message system resends the message. Either of these may lead to the user paying twice, or even three times for one transaction.

SUMMARY OF THE INVENTION

The technical problem to be solved by the present invention is to provide a method and a system for authentication via a communication terminal using short messages, to solve the problems in current short message payment methods that the content of short messages can be easily leaked out by the proxy SP and that loss and delay of short messages may lead to repeated user payments.

In order to solve the above technical problem, a method for authentication via a communication terminal using short messages is provided by the present invention, including:

sending, by the communication terminal to a payment system via an SP1, a short message payment request including a payee's account identifier and a payment amount;

creating, by the payment system, a payment record corresponding to the request, and sending verification information to the communication terminal via an SP2, the verification information including the payee's account identifier and the payment amount;

replying, by the communication terminal, confirmation information to the payment system via the SP2, upon confirming that the payee's account identifier and the payment amount in the verification information are correct; and performing, by the payment system, a corresponding payment operation according to the payment record.

Preferably, the method further includes: choosing randomly, by the payment system, one SP2 from a plurality of SP2s when sending the verification information to the communication terminal via an SP2.

The method further includes: generating, by the payment system, a record number when creating the payment record and sending the record number in the verification information; the confirmation information returned by the communication terminal being the record number.

Preferably, the record number is generated randomly and formed by a combination of arbitrary number of English letters or numerals.

Preferably, the method further includes, before the payment system creates the payment record: checking, by the payment system, whether an account corresponding to the communication terminal and the payee's account identifier exists in account information and if the account exists, creating the payment record.

The account identifier is an account number, a communication terminal number which has a binding relationship with the account number, an email address, an account holder's name or a Resident Identity Card number. The payee's account identifier in the verification information is a payee's name which has a binding relationship with the payee's account number.

The method further includes: returning, by the payment system, an operation result to the communication terminal and a payee's communication terminal which has a binding relationship with a payee's account number via the SP1 or the SP2.

The present invention also provides a system for authentication via a communication terminal using short messages, including:

a first short message interaction subsystem, configured to receive a short message payment request sent by the communication terminal and forward the request to an account management subsystem, the request including a payee's account identifier and a payment amount;

the account management subsystem, configured to create a payment record corresponding to the payment request, send verification information to a second short message interaction subsystem, the verification information including the payee's account identifier and the payment amount and perform a corresponding payment operation according to the payment record upon receiving confirmation information;

the second short message interaction subsystem, configured to receive the verification information, forward the verification information to the communication terminal and forward the confirmation information to the account management subsystem upon receiving the confirmation information indicating that the communication terminal confirms that the payee's account identifier and the payment amount in the verification information are correct.

Preferably, a plurality of second short message interaction subsystems are configured, from which the account management subsystem chooses randomly one second short message interaction subsystem when sending the verification information to a second short message interaction subsystem.

Preferably, the account management subsystem includes: a database, configured to store account information and a binding relationship between the communication terminal and the account information; a payment processing unit, configured to create the payment record corresponding to the communication terminal, generate a record number and perform a corresponding payment operation according to the payment record while an authentication by the authentication unit is passed; and an authentication unit, configured to send the record number in the verification information to the second short message interaction subsystem and if the received confirmation information is a matched record number, the authentication is passed.

Preferably, the record number is generated randomly and formed by a combination of arbitrary number of English letters or numerals.

Preferably, the account management subsystem further includes an account checking unit configured to check whether an account corresponding to the communication terminal and the payee's account identifier exists in the account information stored in the database and if the account exists, trigger the payment processing unit to create the payment record.

The account identifier is an account number, a communication terminal number which has a binding relationship with the account number, an email address, an account holder's name or a Resident Identity Card number. The payee's account identifier in the verification information is a payee's name which has a binding relationship with the payee's account number.

Compared with the prior art, the present invention has the following advantages:

First of all, short messages between the communication terminal and the payment system are transmitted in a dual channel (SP1 and SP2) asynchronous transmission mechanism, which solves the security problem in the plaintext transmission of short messages. First, if the short message information is leaked out at proxy SP1 end, and someone changes payee's account identifier and payment amount in the content of the short message to their own account identifier and an amount, verification information is returned by proxy SP2 end after the payment system creates a payment record. When the user finds out that the payee's account identifier and the payment amount are incorrect, he will not send confirmation information and thus the payment system is not able to perform the payment process. Therefore, security of the short message information at the SP1 end is guaranteed. Second, if short message information is leaked out at proxy SP2 end and someone changes the payee's account identifier and payment amount in the content of the short message to their own account identifier and an amount and returns, directly to the payment system, because a payment record is already created and the returned short message is merely for confirmation that the created payment can be performed, the correct payment process will not be affected if the short message is tempered by the SP2 end.

Secondly, security of short messages in plaintext transmission can also be guaranteed by configuring multiple proxy SP2s and choosing one SP2 from them each time the payment system needs a SP2 to send verification information to the user. That's because when both SP1 and an arbitrary SP2 server are under control, there is little probability that the controlled SP2 is chosen randomly, thus unauthorized payment is unlikely to succeed. Even if the SP1 and all the SP2 servers are under control, because the unauthorized person has to create account information at the payment system to complete the payment, his information can be found quickly.

Thirdly, the dual channel mechanism also solves the problem of repeating short message payments. If a user or the system resends a payment request because the short message sent by the user is lost or delayed, the payment system creates multiple payment records for the same payment request and the user will receive multiple verification information. Therefore, the user can know the number of times that he sends the payment short message, thereby cancelling the repeated payment.

Finally, by sending a record number to the user which is randomly generated when a payment record is created and using the record number as the confirmation information returned by the user, the user can identify multiple repeated payment information corresponding to the same payment more clearly; on the other hand, the payment system can verify the payment operation more conveniently. Furthermore, preferably, the present invention chooses two arbitrary letters in the English alphabet to form the record number by combination, which makes it easy for the user to reply the confirmation information.

DETAILED DESCRIPTION OF THE INVENTION

The above objectives, characteristics and advantages of the present invention will be easily understood by reference to the following description of embodiments when read in conjunction with the accompanying drawings.

The invention uses a dual channel asynchronous mechanism to address the security problem and the repeated payments problem in short message payment method. SP servers are configured at two SP ends, short message information is transmitted between the communication terminal and the payment system via the SP1 in plaintext and payment authentication is performed by SP2. Security of short message payment is guaranteed and repeated payments are prevented.

Figure 1:
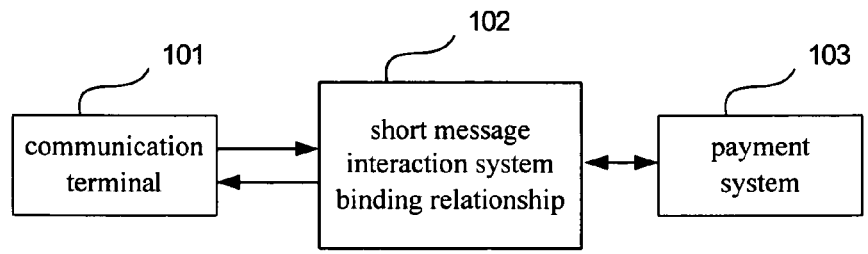
FIG. 1 illustrates authentication via a communication terminal using short messages in the prior art.
Figure 2:
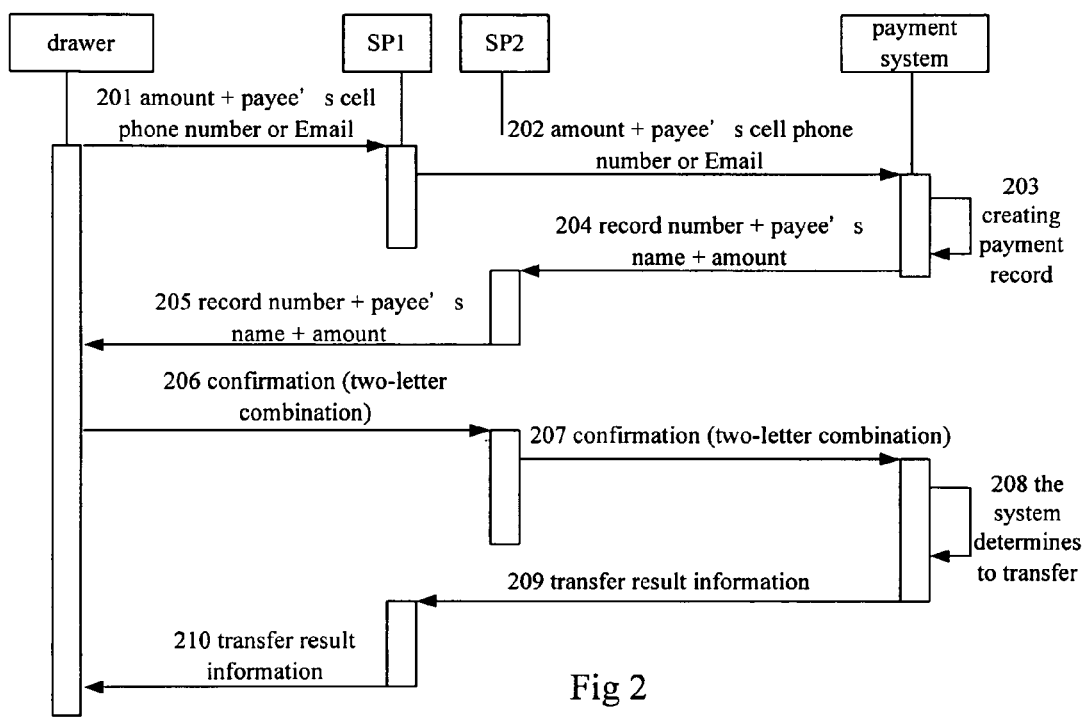
FIG. 2 illustrates a flow chart of authentication for short message payment method according to an embodiment of the invention.

A detailed implementing procedure can be referred to FIG. 2, a flow chart of authentication for short message payment method according to an embodiment of the invention. In the figure, the communication terminal used by the payer includes cell phones, Personal Handy-phone System terminals, and other devices with short message interaction functions. The payment system can be configured by a financial institute (e.g., a bank) or configured by a third party providing payment services. SP1 and SP2 can be proxy servers configured by different short message service providers. A user using short message payment method sets up an account (a virtual account if configured by a third party) at the payment system in advance, registers a communication terminal number and creates a binding relationship between the communication terminal number and account information including account number, personal information of the account holder (e.g., name, address), account balance information, etc.

At step 201, the payer sends a payment request in the form of a short message to the SP1 via a communication terminal. The request includes information such as a number of the communication terminal which sends the short message, user identifier of the payee and payment amount. The user identifier of the payee can be information that uniquely identifies the user identity, such as an account number of the payee in the payment system, a communication terminal number to which the account number is bound, an Email address, name of the payee or a Resident Identity Card number. In this embodiment, the payer sends a short message instruction "payee cell phone number/Email+amount" to a service number of a first SP (referred to as SP1) with a service number of 1000 (for exemplary purpose, not an actual service number).

At step 202, after receiving the short message payment request sent by the communication terminal, the SP1 extracts the communication terminal number and forwards the short message containing the content of "payee cell phone number/Email+amount" and the communication terminal number of the payer to the payment system via HTTPS (Hypertext Transfer Protocol Secure). The present invention does not limit protocols that used for transmitting short messages.

At step 203, the payment system creates a payment record based on the short message instruction and the binding relationship between the payer's communication terminal number and the account information. Preferably, a record number is generated when creating the payment record, e.g., ABC12345, which indicates a number of a transaction, created via short message payment. The use of the record number will be described hereinafter.

In practice, the record number is a string of Arabic numerals, because the operations are complicated and users are likely to make mistakes while inputting if they are asked to reply the actual record number. Preferably in this embodiment, a combination of two arbitrary letters in the English alphabet is used to represent a transaction of the day. Overall, the number of transactions that can be represented is 26×26=676. Because short message payment method is mostly for small amount payments and it is unlikely for a user to do 676 transactions a day, using a two letter combination to represent transactions can simplify record numbers and make user's operations easier.

Preferably in this embodiment, in order to prevent the situation where the SP1 end is illegally controlled and leaks out the content of short messages sent by the payer, before creating the payment record on receipt of the payment request, the payment system checks whether the payer and the payee have set up account information and if set account information includes account information bound to the payee cell phone number/Email and account information bound to the payer's communication terminal number, money transfer is accepted; otherwise, the payment system returns to the communication terminal of the payer information indicating that the payee's account does not exist.

At step 204, the payment system sends verification information to the payer to perform payment authentication. In this embodiment, "payee name+record number+payment amount" and the payer's communication terminal number are sent to a second SP (referred to as SP2) via HTTPS. The payee name can be extracted from user personal information of the payee's account information or from short message contents including the payee name. In practice, normally the payer needs to know the name of the payee, therefore for user experience the payee name is sent to the payer; however, other information that can identify the identity of the payee can be used as a substitute of the payee name.

Preferably, in order to guarantee the security of short messages in plaintext transmission, multiple proxy SP2s are configured and one of them is randomly chosen each time the payment system needs a SP2 to send verification information to the user. The uncertainty of SP2 is therefore increased and thus the security of short message payment is enhanced. The reason why only one SP1 is configured is, SP1 provides not only short message receiving and transmitting functions, but also short message payment function for registered users, i.e., the SP server is configured corresponding to the service number. On the other hand, the SP2 only needs to implement transmitting and receiving of short messages.

At step 205, the SP2 forwards the short message of "payee name+record number+payment amount" to the payer's communication terminal number.

At step 206, the payer receives the verification information, checks that the payee name and the payment amount in the verification information are correct, replies confirmation information to the SP2. In this embodiment, the record number is used as the confirmation information, for one thing, the user can identify multiple repeated payment information corresponding to the same payment more clearly; on the other hand, the payment system can verify the payment operation more conveniently.

At step 207, the SP2 forwards the confirmation information (e.g., the record number) to the payment system via HTTPS.

At step 208, the payment system receives the record number from the payer, compares it with the record number sent at step 205 and if they match, the verification is passed and corresponding payment operation is performed. According to the payment request, the payment amount are deducted from the payer's account and then transferred into the payee's account; if the balance of the payer's account is not enough, information indicating not enough balance is sent in a short message to the payer.

At step 209, the payment system finishes the payment operation and sends transfer result information to the SP1.

At step 210, the SP1 forwards the transfer result information to the communication terminal numbers of the payer and the payee, informing the two parties that the transaction is successfully finished. The payment system may also inform the payer and the payee through the SP2.

The above procedure can solve the security problem and repeated payments problem in short message payment method, which will be described hereinafter with an example of short message payment via a cell phone.

As to the security problem, although all short messages are transmitted in plaintext, a hacker cannot finish a transaction with a plaintext short message captured at any step, thereby preventing the risk brought up by the plaintext transmission of transaction short messages.

Analysis 1: Suppose the hacker captures a transaction short message of a user while it is transmitted from the user to the SP1 and changes the payee to his own cell phone number and an amount. While creating a transaction, the payment system checks the payee's account identifier at the payment system. If the hacker's account does not exist in the payment system, the payment cannot be performed. If the hacker's account has been registered in the payment system, the payment system sends a transaction authentication short message via the SP2 and when the user finds out that the payee's name and the amount are incorrect on receipt of the transaction authentication short message, he will not send confirmation information and thus the hacker cannot succeed.

Analysis 2: Suppose the hacker steals transaction information of the user from the SP2, changes the payee to his own name and replies directly to the payment system. Since the replied short message is only for the purpose of confirmation of the payment of the created transaction, the stolen information is of no use for the hacker.

Analysis 3: Suppose the hacker controls both the SP1 and the SP2 servers, however, because the payment chooses randomly from multiple backup SP2s while sending the verification information, the hacker still can not finish the transaction unless he controls all proxy SPs of the payment system. Nevertheless, the hacker can be quickly found because he has to create account information at the payment system to complete the payment.

As for the problem of repeated payments, if there is no dual channel mechanism, the payer sends a payment instruction to the SP1, the SP1 sends a payment instruction to the payment system and the payment system finishes the payment directly. If due to delay, the short message indicating successful payment is not received for a long time or the system resends the short message, the user may send the payment instruction again, which leads to the user paying twice for the same transaction. On the other hand, because of the dual channel mechanism, the payment system only creates the two transactions, which are not completed before the user's confirmation. Two transaction short messages for confirmation are sent to the user, therefore the user can know the number of times that he does the transaction and he can cancel a repeated payment if it is due to delay or resending.

Furthermore, preferably in the above embodiment, the record number is sent to the user as part of the verification information. In the case that multiple payment records are generated for the same transaction, the user can identify a repeated payment by different record numbers. The user can simply reply the record number and the payment system knows which payment can be performed. Therefore, the use of record numbers makes the whole operation of authentication simpler.

In the above processing procedure of the embodiment of the present invention, the dual channel mechanism is used to guarantee the security of the short message payment process. Therefore, the payer does not need to input a payment password to perform the payment operation, which prevents the payment password from being stolen in the short message transmission process. Furthermore, compared with the method which stores the binding relationship between the communication terminal number and the account information at the proxy SP, the embodiment of the present invention stores it in the payment system, thereby lowing the risk for account information to be leaked out if the proxy SP is illegally controlled.

Figure 3:
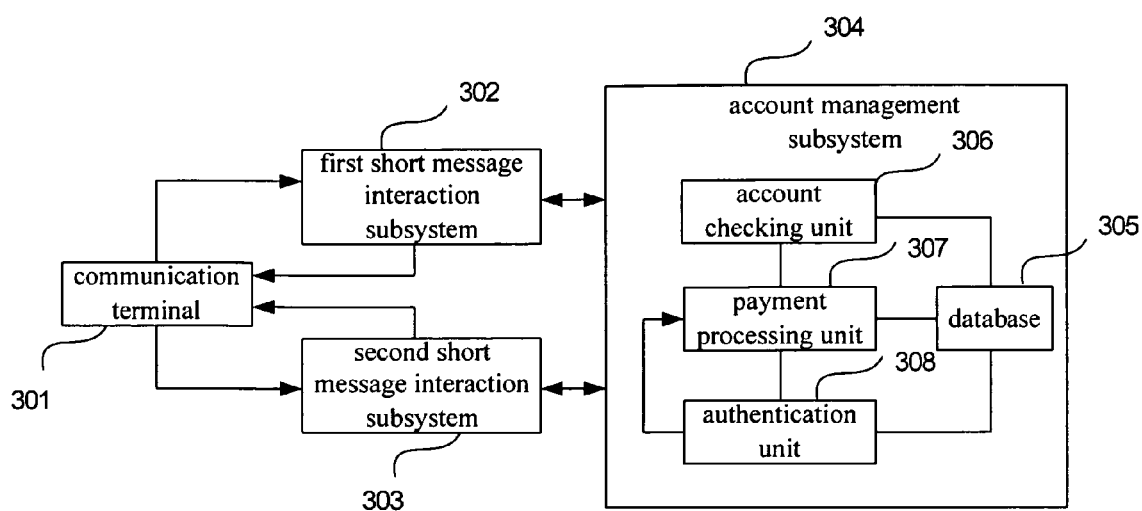
FIG. 3 is a structural block diagram of authentication for short message payment method according to an embodiment of the invention.

A system which implements the above procedure is also provided by the present invention. Refer to FIG. 3, a structural block diagram of authentication for short message payment method according to an embodiment of the invention. The system includes a first short message interaction subsystem 302, a second short message interaction subsystem 303 and an account message subsystem 304.

In the figure, the communication terminal 301 is a device with short message receiving and transmitting functions, such as cell phones, Personal Handy-phone System terminals and PDAs (Personal digital assistants). A registered user sends a payment request to a particular service number by inputting a short message in a particular format. For example, the payer sends a short message instruction "payee cell phone number/Email+amount" to a service number ** of the first short message interaction subsystem 302**. The request includes information such as a communication terminal number of the short message, user identifier of the payee and payment amount. The payee user identifier can be information that uniquely identifies user identity, such as an account number of the payee in the payment system, a communication terminal number to which the account number is bound, an Email address, name of the payee or a Resident Identity Card number.

The first short message interaction subsystem 302 and the second short message interaction subsystem 303 used to implement short message interaction functions with the communication terminal 301 via HTTPS, can be configured by different short message service providers and form the dual channel solution proposed by the embodiment of the present invention in order to deal with the security problem of short message payment to replace the exiting method of single channel receiving and transmitting of short messages. The first short message interaction subsystem 302 is used to forward a short message payment request sent from the communication terminal 301 to the account management subsystem 304, the second short message interaction subsystem 303 is used to forward verification information sent from the account management subsystem 304 to the communication terminal 301 and confirmation information replied by the communication terminal 301.

Preferably, multiple second short message interaction subsystems 303 are configured and one of them is randomly chosen by the payment system to forward verification information to the user, the uncertainty of SP2 is therefore increased and thus the security of short message payment is enhanced. As discussed above, this is to prevent the situation where the first short message interaction subsystem 302 and the second short message interaction subsystem are both controlled. The reason why only one SP1 is configured is that SP1 provides not only short message receiving and transmitting functions, but also the management of the communication terminal number with which short message payment service is registered, i.e., the SP server is configured corresponding to a service number.

The account management subsystem 304 is used to deal with various account services, which can be provided by a financial institute (e.g., a bank) or a third party providing payment service. If it is provided by a third party, the user account set up by the system is a virtual account. The account management subsystem 304 includes a database 305, an account checking unit 306, a payment processing unit 307 and an authentication unit 308.

Users using the short message payment method have to apply for a user account in the account management subsystem 304. The account information is stored in the database 305. Preferably, the binding relationship between the account information and the communication terminal number is stored in the database 305, so as to lower the risk of account information leakage. When the payer sends a short message via the communication terminal, the first short message interaction subsystem 302 (forwarding the payment short message) or the second short message interaction subsystem 303 (forwarding a confirmation short message of verification information) extracts the communication terminal number and forwards the communication terminal number and the content of the short message to the account management subsystem 304. The account management subsystem 304 performs payment process with the payer's account and the payee's account according to the binding relationship stored in the database 305.

Preferably, this embodiment includes an account checking unit 306, which is used to search the database 305 and check whether the payer's account and the payee's account exist. In order to prevent the payee's account from being tampered with, if the payee changed by tampering does not have an account in the account management subsystem 304, the short message payment can not be performed and indication information is returned to the communication terminal.

Upon finding the payer's account and the payee's account in the database, the account checking unit 306 triggers the payment processing unit 307. The payment processing unit 307 is used to create a payment record corresponding to the communication terminal number and awaits an authentication unit 308 to verify the payment authentication is passed and if it is passed, secured payment processing is performed and a processing result is sent to communication terminals of the payer and the payee via the first short message interaction subsystem 302 or the second short message interaction subsystem 303; otherwise, the content of the short message may be tempered and the created payment record will not be executed so as to ensure the safety of the payer's account.

Particularly, the payment processing performed by the payment processing unit 307 is: the payment processing unit 307 searches in the database 305 for a payment account to which the payer's communication terminal number is bound, determines whether the balance of the account is larger than the payment amount and if so, the payment amount is deducted from the payment account and transferred into the payee's account; otherwise, the payer is informed.

An authentication unit 308 is used to guarantee the security of the payment process. The authentication unit 308 sends verification information to the payer's communication terminal and triggers the payment processing unit 307 to finish payment on receipt of confirmation information from the payer. Preferably in this embodiment, the verification information includes a record number generated by the payment processing unit 307 while creating a payment record, a payee's name extracted from the account information in the database 305 and payment amount. Upon receiving the short message, the payer confirms that the payee's name and the payment amount are correct and replies the record number to the authentication unit 308 via the second short message interaction subsystem 303. The authentication unit 308 checks whether the record number in the replied information matches with the one sent to the payer and if so, the authentication is passed and payment can be done securely.

Normally, the record number is a string of letters or numerals. Preferably in this embodiment, a combination of two arbitrary letters in the English alphabet is used to represent a transaction of the day. Overall, the number of transactions that can be represented is 26×26=676. Because short message payment method is mostly for small amount payments and it is unlikely for a user to do 676 transactions a day, using a two letter combination to represent transactions can simplify record numbers and make user's operations easier.

Nowadays, short messages are widely used. Using the method and the system provided by the above embodiments, the security problem of plaintext transmission of short messages can be solved, repeated payments due to poor stability and delay of short messages can be prevented and user's operations can be simplified.

For those parts in FIG. 3 which are not described for the purpose of space saving, please refer to the corresponding parts of the method illustrated by FIG. 2.

A method and a system provided by the present invention for authentication via a communication terminal using short messages are described above. Principle and embodiments of the invention are illustrated by way of example, which is intended only for helping understanding of the method and the core idea of the invention; those skilled in the art may make changes to both the embodiment and the range of application. Therefore, the content of the description should not be considered limitation of the present invention.

The invention claimed is:

1. A payment authentication method, comprising:
  receiving a short message payment request that is sent by a communication terminal and forwarded by a first short message interaction subsystem, the short message payment request comprising a payee's account identifier and a payment amount;
  creating a payment record corresponding to the payment request;
  generating and sending verification information to a second short message interaction subsystem that is different from the first short message interaction subsystem, the verification information comprising the payee's account identifier and the payment amount and being forwarded by the second short message interaction subsystem to the communication terminal to be used for confirming whether the payee's account identifier and the payment amount in the verification information are correct, wherein the second short message interaction subsystem is selected from a plurality of second short message interaction subsystems that are each configured to forward verification information to the communication terminal;
  receiving confirmation information generated by the communication terminal and forwarded by the second short message interaction subsystem, the confirmation information indicating that the payee's account identifier and the payment amount in the verification information are correct; and performing a corresponding payment operation according to the payment record upon receiving confirmation information.

2. The method of claim 1, wherein the second short message interaction subsystem is randomly selected from among the plurality of short message interaction subsystems.

3. The method of claim 1, further comprising generating a record identifier when creating the payment record, the record identifier being included in the verification information; wherein the confirmation information includes the record identifier.

4. The method of claim 3, wherein the record identifier is generated randomly and includes a combination of arbitrary number of Alphanumeric characters.

5. The method of claim 1, further comprising checking whether an account corresponding to the communication terminal and the payee's account identifier already exists; and in the event that the account exists, creating the payment record.

6. The method of claim 1, wherein the payee's account identifier is an account number, a communication terminal number that has a binding relationship with the account number, an email address, an account holder's name, or a Resident Identity Card number.

7. The method of claim 1, wherein the payee's account identifier includes a payee's name that has a binding relationship with the payee's account number.

8. The method of claim 1, further comprising returning an operation result to the communication terminal and a payee's communication terminal that has a binding relationship with the payee's account identifier.

9. A system for payment authentication, comprising:
   an interface configured to receive a short message payment request that is sent by a communication terminal and forwarded by a first short message interaction subsystem, the short message payment request comprising a payee's account identifier and a payment amount;
   an account management subsystem configured to:
      create a payment record corresponding to the payment request;
      generate verification information that is sent to a second short message interaction subsystem that is different from the first short message interaction subsystem, the verification information comprising the payee's account identifier and the payment amount and being forwarded by the second short message interaction subsystem to the communication terminal to be used for confirming whether the payee's account identifier and the payment amount in the verification information are correct, wherein the second short message interaction subsystem is selected from a plurality of second short message interaction subsystems that are each configured to forward verification information to the communication terminal;
      receive confirmation information generated by the communication terminal and forwarded by the second short message interaction subsystem, the confirmation information indicating that the payee's account identifier and the payment amount in the verification information are correct; and
      perform a corresponding payment operation according to the payment record upon receiving confirmation information.

10. The system of claim 9, wherein the account management subsystem is further configured to randomly select the second short message interaction subsystem from among the plurality of short message interaction subsystems.

11. The system of claim 9, wherein:
   the account management subsystem is further configured to generate a record identifier when creating the payment record, the record identifier being included in the verification information; and
   the confirmation information includes the record identifier.

12. The system of claim 11, wherein the record identifier is generated randomly and includes a combination of arbitrary number of Alphanumeric characters.

13. The system of claim 9, wherein the account management subsystem is further configured to:
   check whether an account corresponding to the communication terminal and the payee's account identifier already exists; and
   in the event that the account exists, create the payment record.

14. The system of claim 9, wherein the payee's account identifier is an account number, a communication terminal number that has a binding relationship with the account number, an email address, an account holder's name, or a Resident Identity Card number.

15. The system of claim 9, wherein the payee's account identifier includes a payee's name that has a binding relationship with the payee's account number.

16. The system of claim 9, wherein the account management subsystem is further configured to return an operation result to the communication terminal and a payee's communication terminal that has a binding relationship with the payee's account identifier.

\* \* \* \* \*